United States Patent
Kim et al.

(10) Patent No.: US 11,084,541 B2
(45) Date of Patent: Aug. 10, 2021

(54) INTERNALLY TENSIONED INFLATABLE STRUCTURES

(71) Applicants: GM GLOBAL TECHNOLOGY OPERATIONS LLC, Detroit, MI (US); THE REGENTS OF THE UNIVERSITY OF MICHIGAN, Ann Arbor, MI (US)

(72) Inventors: Wonhee M. Kim, Royal Oak, MI (US); Paul W. Alexander, Ypsilanti, MI (US); Jonathan E. Luntz, Ann Arbor, MI (US); Diann Brei, Milford, MI (US); Noah Luntzlara, Ann Arbor, MI (US); Yun Ju Kim, Yongin-si (KR); Zining Zhang, Zhuozhou (CN); Laura Alejandra Giner Munoz, Ann Arbor, MI (US); Koray Benli, Ann Arbor, MI (US)

(73) Assignees: GM GLOBAL TECHNOLOGY OPERATIONS LLC, Detroit, MI (US); THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 161 days.

(21) Appl. No.: 16/566,683

(22) Filed: Sep. 10, 2019

(65) Prior Publication Data
US 2021/0070381 A1    Mar. 11, 2021

(51) Int. Cl.
*B62D 35/00* (2006.01)
*F16H 1/28* (2006.01)

(52) U.S. Cl.
CPC .............. *B62D 35/007* (2013.01); *F16H 1/28* (2013.01)

(58) Field of Classification Search
CPC ................................ B62D 35/007; F16H 1/28
See application file for complete search history.

(56) References Cited

U.S. PATENT DOCUMENTS

| | | |
|---|---|---|
| 2,979,287 A | 4/1961 | Ross |
| 3,138,506 A | 6/1964 | Ross |
| 4,292,701 A | 10/1981 | Woychick |
| 4,826,715 A | 5/1989 | Lee |

(Continued)

OTHER PUBLICATIONS

U.S. Appl. No. 15/954,788, filed Apr. 14, 2018, Khalighi et al.

(Continued)

*Primary Examiner* — Lori L Lyjak
(74) *Attorney, Agent, or Firm* — Harness, Dickey & Pierce, P.L.C.

(57) ABSTRACT

An inflatable structure includes a top end cap, a bottom end cap, a bladder, a plurality of tethers, and an adjustment mechanism. The bladder is attached to the top and bottom end caps and configured to hold pressurized air therebetween. The plurality of tethers are disposed within the bladder. Each tether in the plurality of tethers has a first end coupled to the top end cap and a second end coupled to the bottom end cap. When the bladder is inflated, the plurality of tethers restrict a number of degrees of freedom of the inflatable structure and a type of the degrees of freedom. The adjustment mechanism is operable to move the second end of at least one tether in the plurality of tethers to adjust at least one of the number of the degrees of freedom and the type of the degrees of freedom.

20 Claims, 10 Drawing Sheets

(56) References Cited

U.S. PATENT DOCUMENTS

| | | | |
|---|---|---|---|
| 5,152,018 A | 10/1992 | Lea | |
| 9,821,862 B2 | 11/2017 | Han et al. | |
| 10,398,235 B2 | 9/2019 | Lin et al. | |
| 2004/0188988 A1 | 9/2004 | Wipasuramonton et al. | |
| 2006/0288489 A1 | 12/2006 | Yang | |
| 2007/0046001 A1 | 3/2007 | Hirata | |
| 2007/0200329 A1 | 8/2007 | Ma | |
| 2008/0296946 A1 | 12/2008 | Reynolds et al. | |
| 2009/0320211 A1 | 12/2009 | Lau | |
| 2011/0068604 A1 | 3/2011 | Neuberger et al. | |
| 2012/0126572 A1* | 5/2012 | Hjelm | B62D 35/001 296/180.1 |
| 2014/0101861 A1 | 4/2014 | Gowda et al. | |
| 2015/0201760 A1 | 7/2015 | Lin et al. | |
| 2017/0042338 A1 | 2/2017 | Yang | |
| 2017/0106830 A1 | 4/2017 | Rohn et al. | |
| 2018/0065690 A1 | 3/2018 | Han et al. | |
| 2018/0281874 A1 | 10/2018 | Han et al. | |
| 2018/0362142 A1 | 12/2018 | V Zquez Castro et al. | |
| 2019/0186463 A1* | 6/2019 | Akay | F03D 7/0276 |
| 2019/0195427 A1 | 6/2019 | Alexander et al. | |
| 2019/0226197 A1* | 7/2019 | Bright | E04H 15/20 |
| 2019/0299909 A1 | 10/2019 | Alexander et al. | |
| 2019/0337469 A1* | 11/2019 | Preisler | B60R 13/005 |
| 2020/0255117 A1* | 8/2020 | Prokhorov | B64C 3/46 |

OTHER PUBLICATIONS

U.S. Appl. No. 15/970,221, filed May 3, 2018, Dadheech et al.
U.S. Appl. No. 16/114,423, filed Aug. 28, 2018, Alexander et al.
U.S. Appl. No. 16/227,177, filed Dec. 20, 2018, Han et al.
U.S. Appl. No. 16/443,029, field Jun. 17, 2019, Han et al.
U.S. Appl. No. 16/566,374, filed Sep. 10, 2019, Han et al.
U.S. Appl. No. 16/566,584, filed Sep. 10, 2019, Kim et al.
U.S. Appl. No. 16/566,631, filed Sep. 10, 2019, Kim et al.

\* cited by examiner

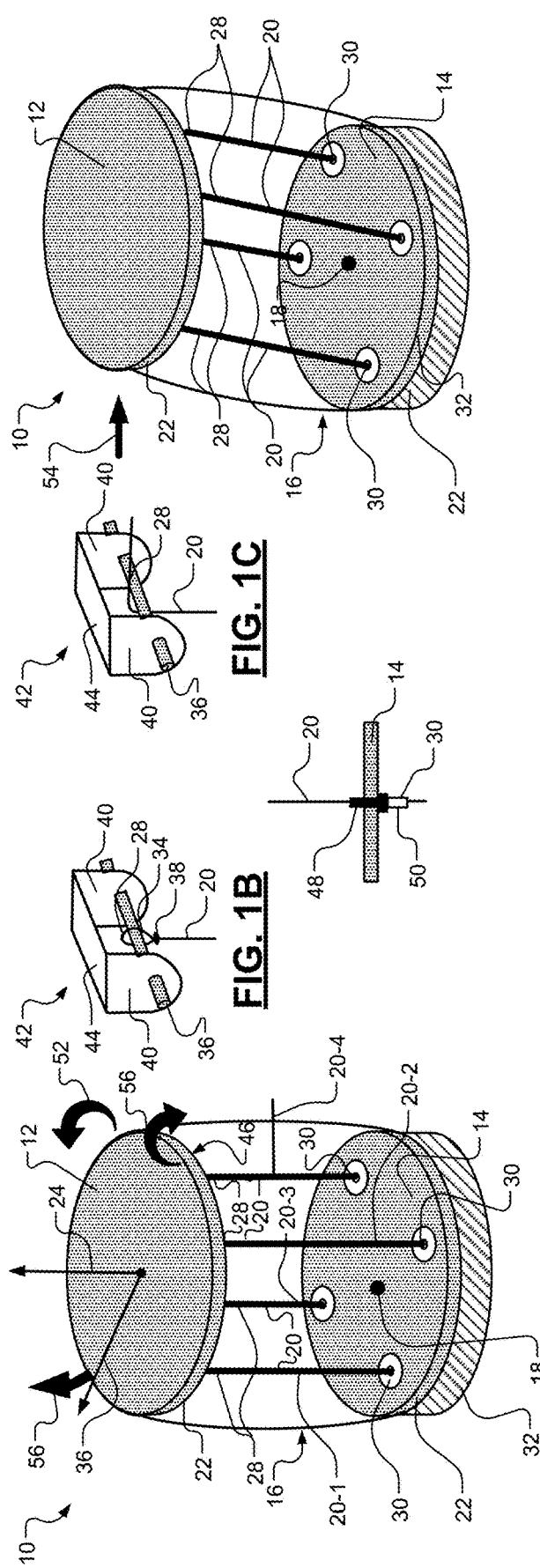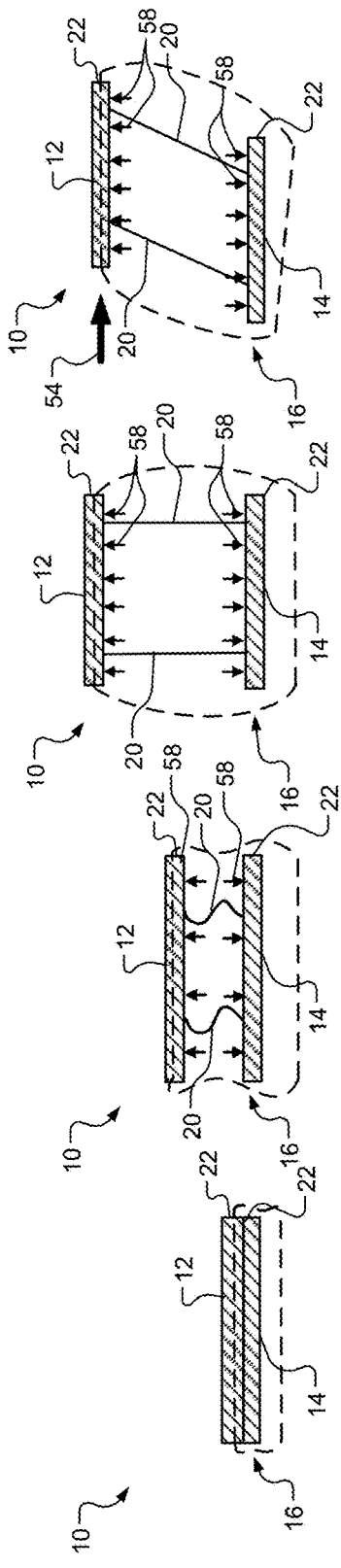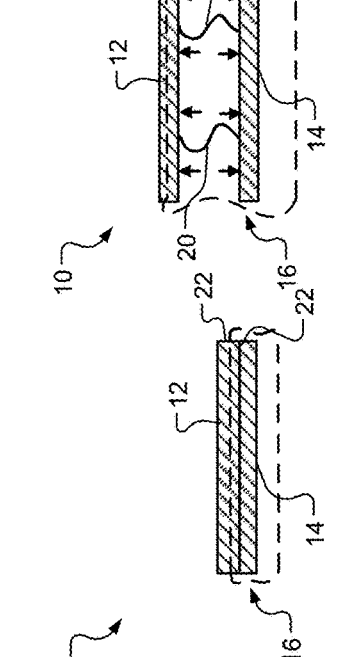

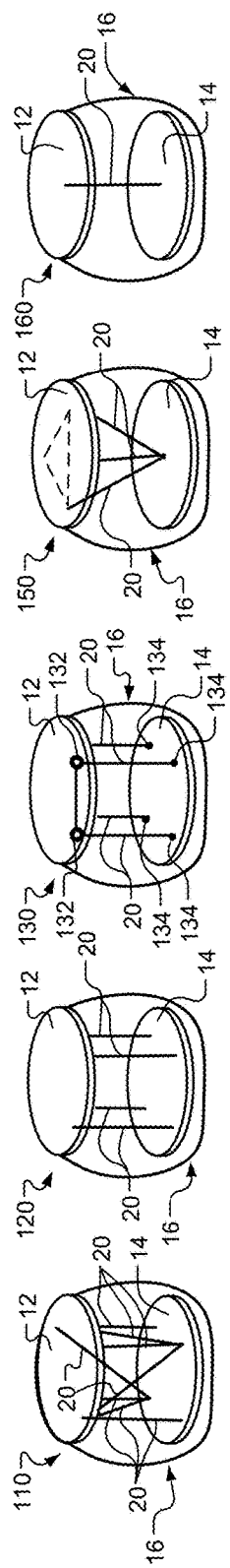

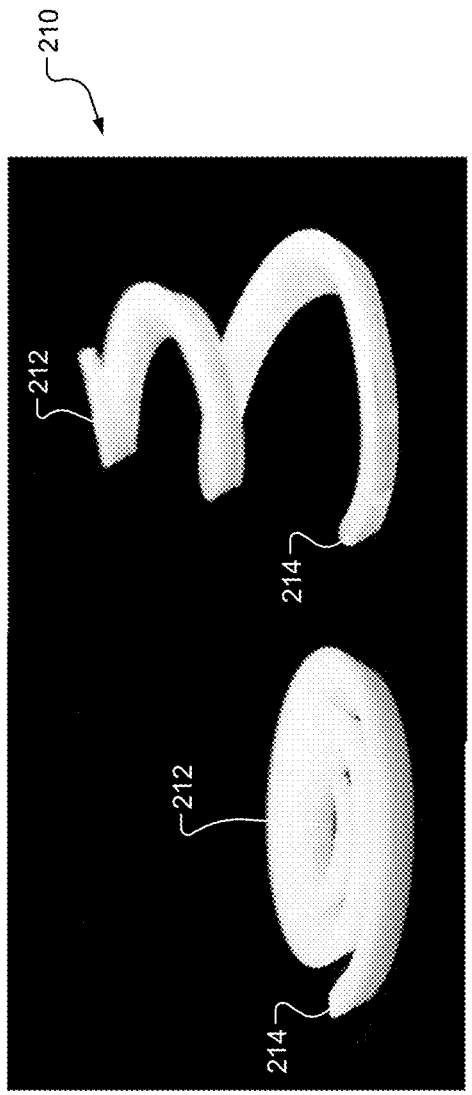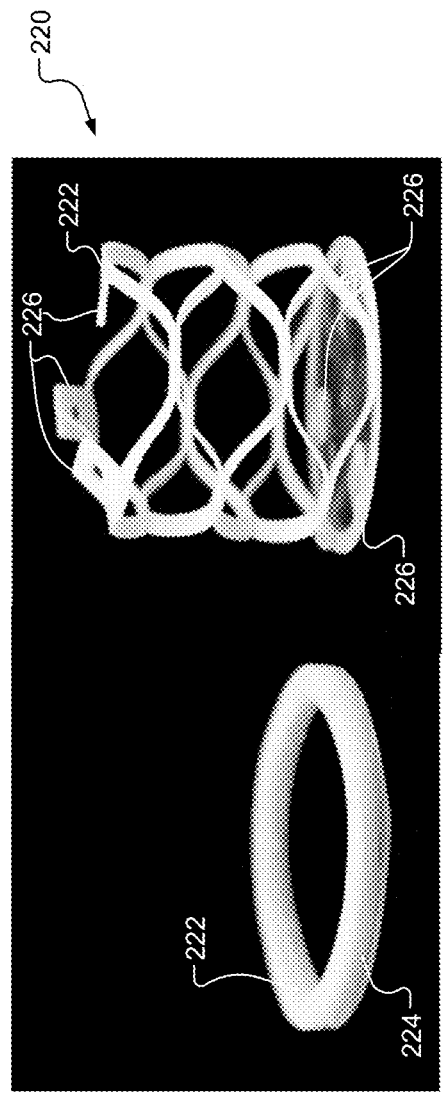
FIG. 21　FIG. 22　FIG. 23　FIG. 24

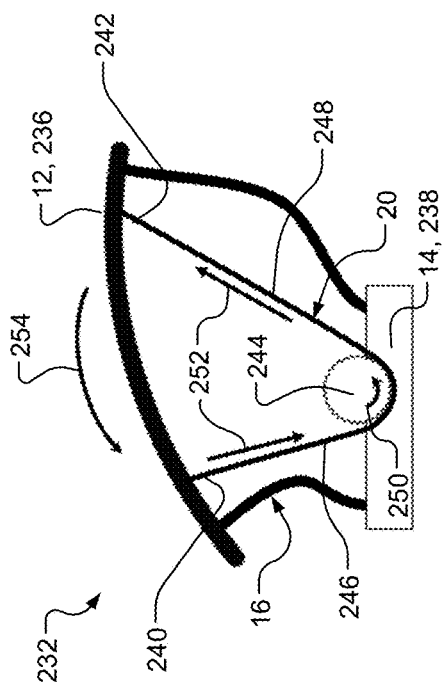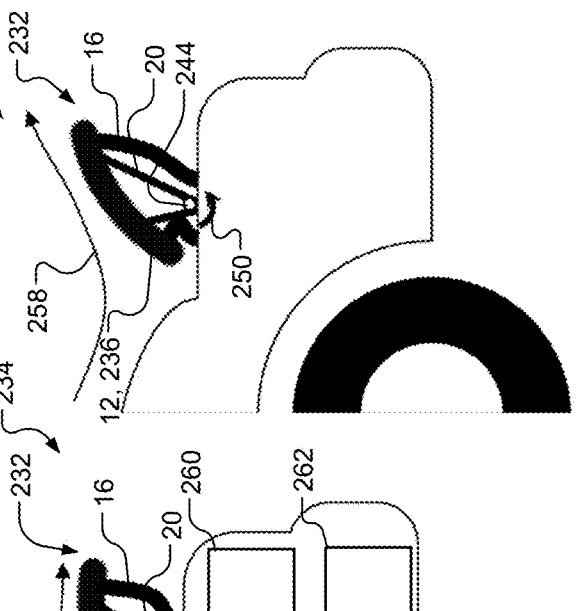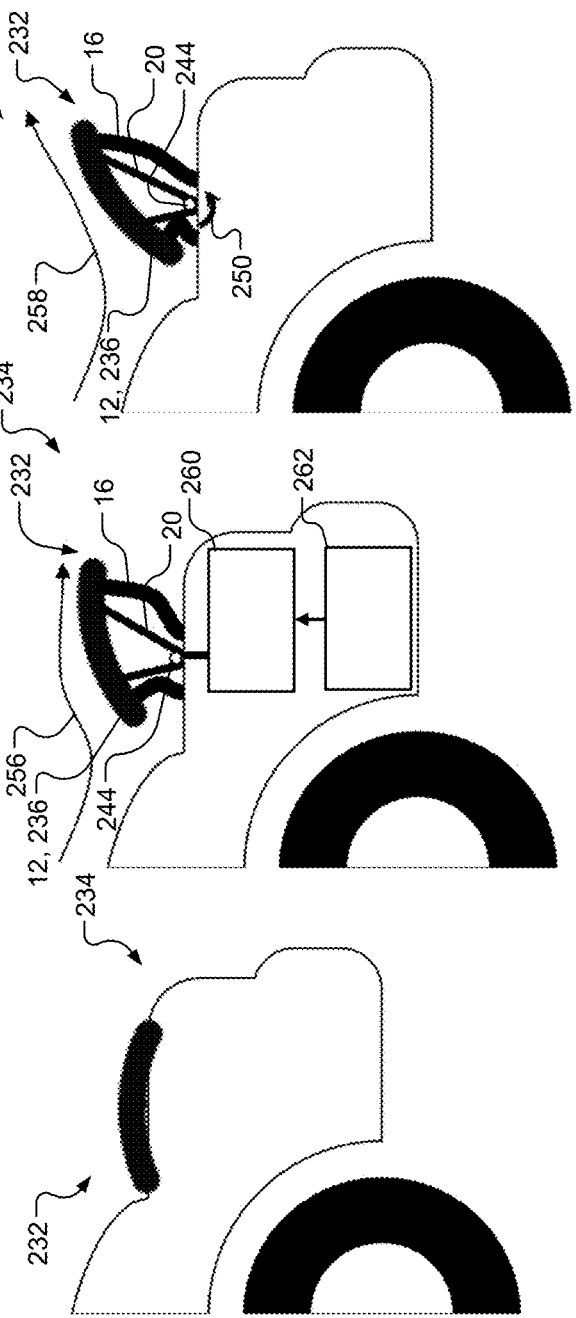

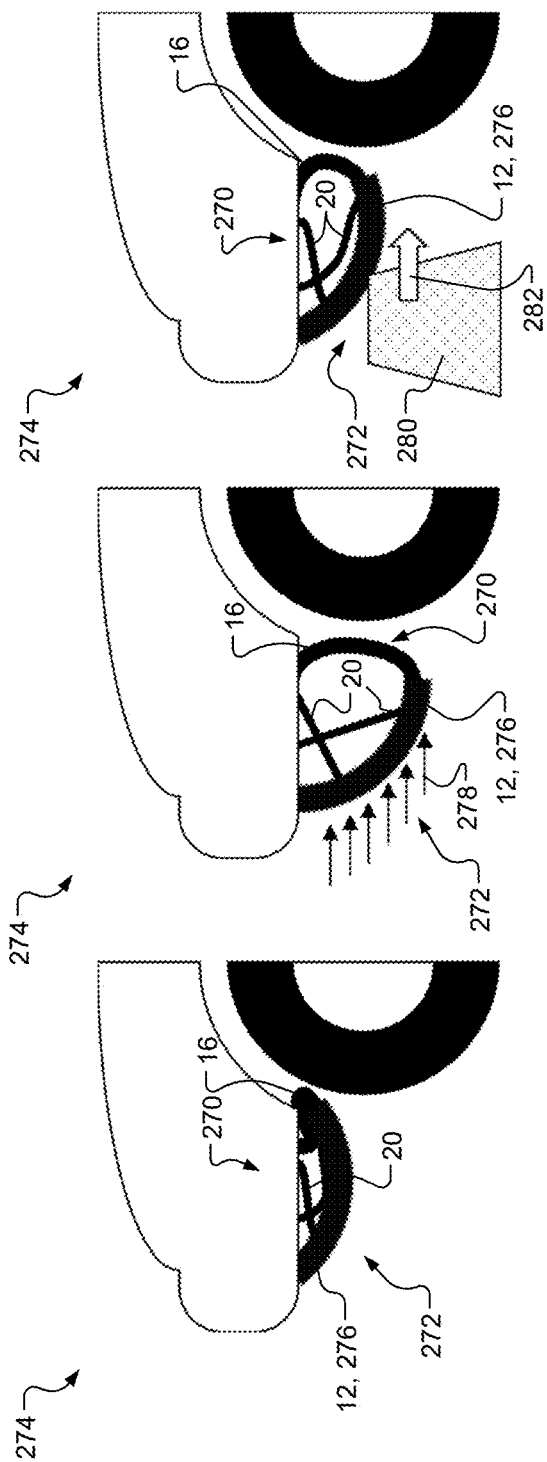

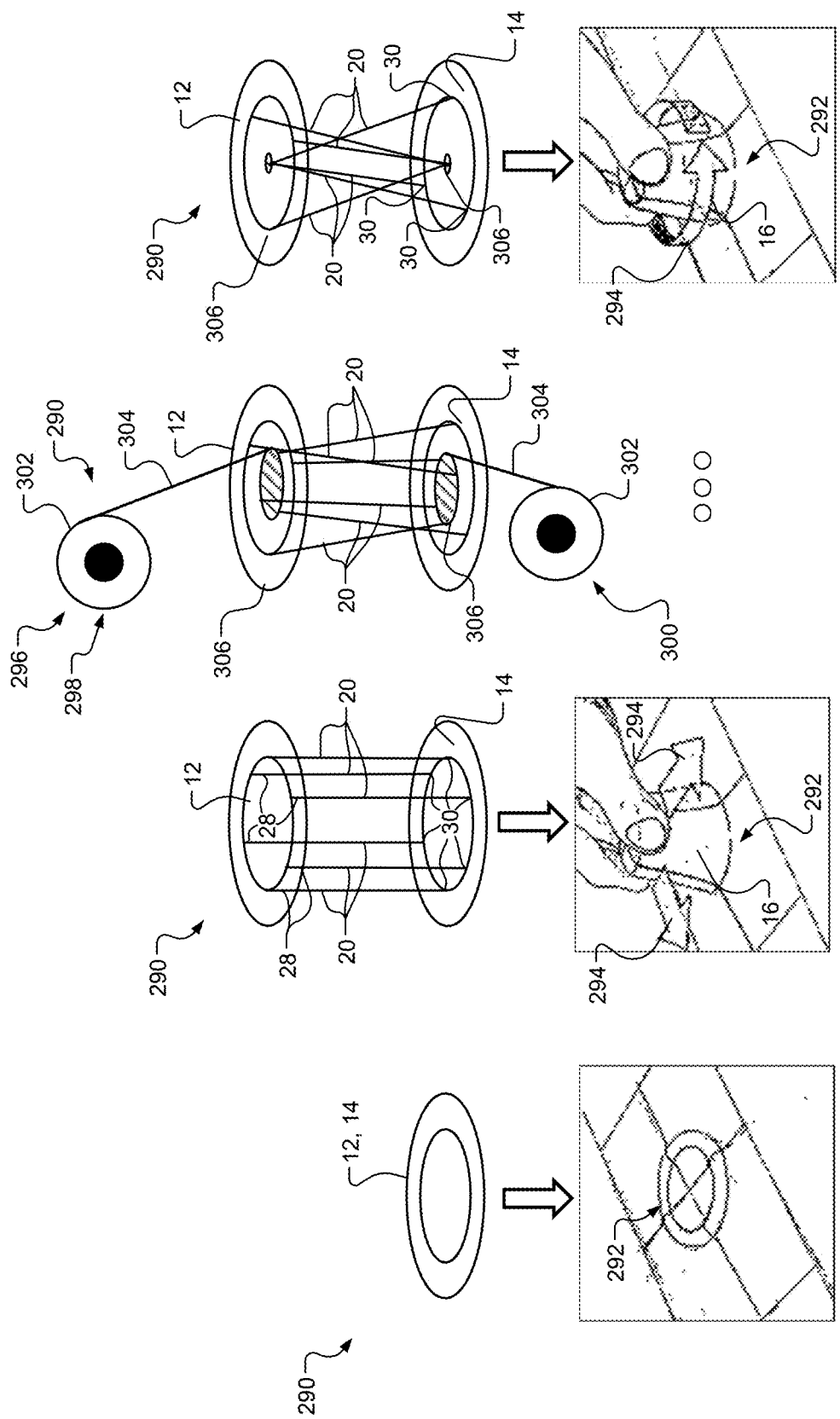

INTERNALLY TENSIONED INFLATABLE STRUCTURES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to internally tensioned inflatable structures.

Some internally tensioned inflatable structures include a bladder that holds pressurized air and threads that are attached to opposite internal surfaces of the bladder. The threads are typically attached to the internal surfaces of the bladder using drop stitching. As the bladder is inflated, the pressure within the bladder causes the bladder to expand outward and thereby applies tension to the threads, which in turn limits expansion of the bladder. In addition to limiting expansion of the bladder, the threads increase the amount of compressive load that the bladder may withstand before the bladder deforms due to the compressive load. Thus, internally tensioned inflatable structures are used in devices such as airplane wings that require a high compressive strength to weight ratio.

SUMMARY

An inflatable structure according to the present disclosure includes a top end cap, a bottom end cap, a bladder, a plurality of tethers, and an adjustment mechanism. The bladder is attached to the top and bottom end caps and configured to hold pressurized air between the top and bottom end caps. The plurality of tethers are disposed within the bladder. Each tether in the plurality of tethers has a first end coupled to the top end cap and a second end coupled to the bottom end cap. When the bladder is inflated, the plurality of tethers restrict a number of degrees of freedom of the inflatable structure and a type of the degrees of freedom. The adjustment mechanism is operable to move the second end of at least one tether in the plurality of tethers to adjust at least one of the number of the degrees of freedom and the type of the degrees of freedom.

In one example, the adjustment mechanism is operable to move the second end of at least one tether in the plurality of tethers to adjust the number of the degrees of freedom.

In one example, the adjustment mechanism is operable to move the second end of at least one tether in the plurality of tethers to adjust the type of the degrees of freedom.

In one example, the adjustment mechanism is operable to move the second end of at least one tether in the plurality of tethers to adjust the type of the degrees of freedom between at least two of axial motion, bending motion, torsional motion, and shearing motion.

In one example, the first end of each tether in the plurality of tethers is fixed to the top end cap, the adjustment mechanism is coupled to the bottom end cap, at least a portion of the adjustment mechanism is disposed within the bladder, and the second end of each tether in the plurality of tethers is fixed to the portion of the adjustment mechanism that is disposed within the bladder.

In one example, the adjustment mechanism includes a shaft extending through the bottom end cap, a sun gear disposed within the bladder and attached to the shaft, and at least one planet gear disposed within the bladder and engaged with the sun gear The second end of at least one tether in the plurality of tethers is fixed to the at least one planet gear such that rotating the shaft causes the second end of the at least one tether to rotate about a rotational axis of the at least one planet gear.

In one example, the plurality of tethers includes a first tether, a second tether, and a third tether, the at least one planet gear includes a first planet gear, a second planet gear, and a third planet gear. The second ends of the first, second, and third tethers are fixed to the first, second, and third planet gears, respectively, such that rotating the shaft causes the second ends of the first, second, and third tethers to rotate about the rotational axes of the first, second, and third planet gears and thereby adjusts the type of the degrees of freedom between a shearing motion and a bending motion.

In one example, rotating the shaft adjusts each of the first, second, and third tethers between a first position in which the first, second, and third tethers are perpendicular to the top and bottom end caps and a second position in which the first, second, and third tethers form a tripod shape.

In one example, the adjustment mechanism includes a first peg that extends through the bottom end cap, the second end of at least one tether in the plurality of tethers is fixed to an end of the first peg disposed within the bladder, and the first peg is translatable in a direction perpendicular to the bottom end cap to adjust a tension of the at least one tether and thereby adjust at least one of the number of the degrees of freedom and the type of the degrees of freedom.

In one example, the first peg is translatable in the direction perpendicular to the bottom end cap to adjust the tension of the at least one tether between zero tension and a tension level greater than zero.

In one example, the adjustment mechanism further includes a second peg that extends through the bottom end cap, and the plurality of tethers includes a first pair of tethers and a second pair of tethers. The second end of each tether in the first pair of tethers is fixed to the end of the first peg disposed within the bladder. The second end of each tether in the second pair of tethers is fixed to the end of the second peg disposed within the bladder. The first and second pegs are translatable in the direction perpendicular to the bottom end cap to adjust the tension of the first and second pairs of tethers and thereby adjust the number of the degrees of freedom and the type of the degrees of freedom.

In one example, a control knob includes the inflatable structure, and the adjustment mechanism is operable to move the second end of each tether in the plurality of tethers to adjust the degrees of freedom between a shearing motion and a torsional motion.

An inflatable structure according to the present disclosure includes a top end cap, a bottom end cap, a bladder, a plurality of tethers, and a spring. The bladder is attached to the top and bottom end caps and configured to hold pressurized air between the top and bottom end caps. The plurality of tethers are disposed within the bladder, each tether in the plurality of tethers having a first end coupled to the top end cap and a second end coupled to the bottom end cap. The spring is disposed within the bladder and attached to the top and bottom end caps. The spring is configured to align the top and bottom end caps relative to one another when the inflatable structure is adjusted from a deployed position to a stowed position.

In one example, the spring is further configured to twist the bladder about a longitudinal axis of the inflatable structure and thereby pull the bladder radially inward when the inflatable structure is adjusted from the deployed position to the stowed position.

In one example, the spring is a coil spring.

In one example, the spring is a wave spring.

In one example, the plurality of tethers extend in a direction perpendicular to the top and bottom end caps by a first distance, and the bladder has a length that is greater than the first distance such that, when the bladder is inflated, the plurality of tethers are in tension and the bladder has slack.

Another inflatable structure according to the present disclosure includes a top end cap, a bottom end cap, a bladder, a tether, and a reel. The bladder is attached to the top and bottom end caps and configured to hold pressurized air between the top and bottom end caps. The tether is disposed within the bladder. The tether has a first end and a second end opposite of the first end. The first and second ends of the tether are coupled to one of the top and bottom end caps. The reel is disposed within the bladder and coupled to the other one of the top and bottom end caps. The tether extends around the reel. The tether includes a first segment that extends between the reel and the first end of the tether and a second segment that extends between the reel and the second end of the tether. The reel is operable to adjust a first length of the first segment and a second length of the second segment and thereby adjust a shape of the inflatable structure.

In one example, an inflatable system includes the inflatable structure, and an electric motor operable to rotate the reel and thereby adjust the shape of the inflatable structure.

In one example, a spoiler of a vehicle includes the inflatable structure.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A is a perspective view of an inflatable structure according to the present disclosure, the inflatable structure including a top end cap, a bottom end cap, and a plurality of tethers extending between the top and bottom end caps;

FIG. 1B is a perspective view of a fixed attachment between the top end cap of FIG. 1A and one of the tethers of FIG. 1A;

FIG. 1C is a perspective view of a sliding or threaded attachment between the top end cap of FIG. 1A and one of the tethers of FIG. 1A;

FIG. 1D is a section view of mixed attachment between the bottom end cap of FIG. 1A and one of the tethers of FIG. 1A;

FIG. 2 is a perspective view of the inflatable structure of FIG. 1A after the top end cap has been moved in a shear direction relative to the bottom end cap;

FIG. 3 is a section view of the inflatable structure of FIG. 1A when the inflatable structure is uninflated;

FIG. 4 is a section view of the inflatable structure of FIG. 1A when the inflatable structure is inflating;

FIG. 5 is a section view of the inflatable structure of FIG. 1A when the inflatable structure is fully inflated;

FIG. 6 is a section view of the inflatable structure of FIG. 1A after the top end cap has been moved in the shear direction relative to the bottom end cap;

FIG. 12A is a perspective view of another inflatable structure according to the present disclosure;

FIGS. 12B-12E are perspective views illustrating the degrees of freedom of the inflatable structure of FIG. 12A;

FIG. 13A is a perspective view of the inflatable structure of FIG. 1A when the tethers are attached to the top end cap using the fixed attachment of FIG. 1B;

FIGS. 13B-13E are perspective views illustrating the degrees of freedom of the inflatable structure of FIG. 13A;

FIG. 14A is a perspective view of the inflatable structure of FIG. 1A when the tethers are attached to the top end cap using the threaded attachment of FIG. 1C;

FIGS. 14B-14F are perspective views illustrating the degrees of freedom of the inflatable structure of FIG. 14A;

FIG. 15A is a perspective view of another inflatable structure according to the present disclosure;

FIGS. 15B-15E are perspective views illustrating the degrees of freedom of the inflatable structure of FIG. 15A;

FIG. 16A is a perspective view of another inflatable structure according to the present disclosure;

FIGS. 16B-16E are perspective views illustrating the degrees of freedom of the inflatable structure of FIG. 16A;

FIG. 21 is a perspective view of a coil spring that may be included in an inflatable structure according to the present disclosure, with the coil spring shown in a relaxed state;

FIG. 22 is a perspective view of the coil spring of FIG. 21 with the coil spring shown in tension;

FIG. 23 is a perspective view of a multi-turn wave spring that may be included in an inflatable structure according to the present disclosure, with the wave spring shown in a relaxed state;

FIG. 24 is a perspective view of the wave spring of FIG. 23 with the wave spring shown in tension;

FIG. 25 is a section view of a rear end of a vehicle including a rear spoiler according to the present disclosure with the rear spoiler shown in a stowed position;

FIG. 26A is a section view of the rear end of the vehicle of FIG. 25 with the rear spoiler shown in a deployed position;

FIG. 26B is an enlarged section view of the rear spoiler of FIG. 25 with the rear spoiler shown in the deployed position;

FIG. 27 is a section view of the rear end of the vehicle of FIG. 25 with the spoiler shown in a deployed position and the shape of the spoiler adjusted relative to its shape in FIG. 26;

FIG. 28 is a section view of a front end of a vehicle including an air dam according to the present disclosure with the air dam shown in a stowed position;

FIG. 29 is a section view of the front end of the vehicle of FIG. 28 with the air dam shown in a deployed position;

FIG. 30 is a section view of the front end of the vehicle of FIG. 28 with the shape of the air dam altered due to contact with an object;

FIG. 31 is a perspective view of a control knob including another inflatable structure according to the present disclosure, with the inflatable structure shown in an uninflated state;

FIG. 32 is a perspective view of the control knob of FIG. 31 showing the inflatable structure in an inflated state and ends of tethers within the inflatable structure located to enable a shearing motion of the inflatable structure;

FIG. 33 is a perspective view of the inflatable structure of FIG. 31 showing the ends of the tethers being relocated relative to their locations in FIG. 32; and FIG. 34 is a perspective view of the control knob of FIG. 31 showing the ends of the tethers located to enable a torsional motion of the inflatable structure.

In the drawings, reference numbers may be reused to identify similar and/or identical elements.

DETAILED DESCRIPTION

Figure 8:
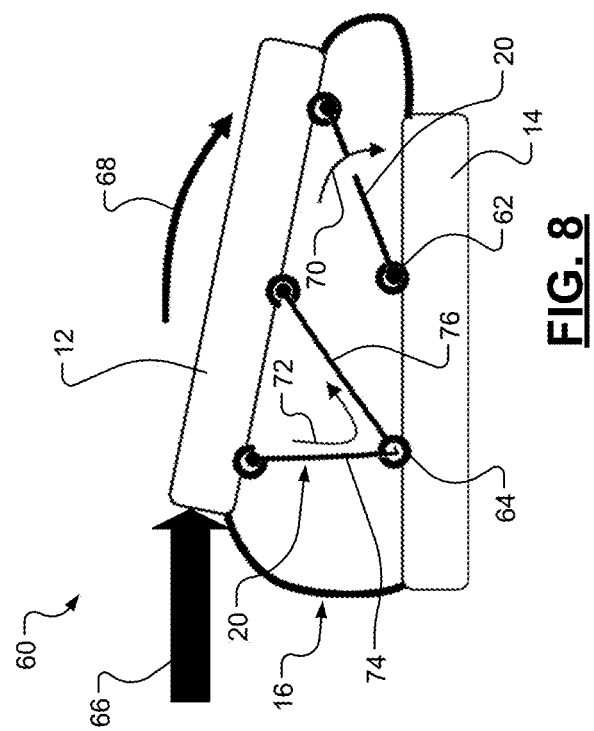
FIG. 8 is a section view of the inflatable structure of FIG. 7 after the top end cap has been moved in a bending direction relative to the bottom end cap.

Certain devices, such as airplane wings, are designed to change shape during operation. Such devices typically include complex rigid mechanisms that enable the devices to change during operation of the devices. These rigid mechanisms increase the cost and mass of the device.

An internally tensioned inflatable structure according to the present disclosure may be incorporated into a device to enable the shape of the device to be changed during operation of the device without significantly increasing the cost and mass of the device. In one example, the inflatable structure includes the top end cap, a bottom end cap, a plurality of tethers coupled to the top and bottom end caps, and a bladder attached to the top and bottom end caps and configured to hold pressurized fluid. When a load is applied to the top end cap, the top end cap can move freely relative to the bottom end cap in one or more directions. The directions in which the top end cap is free to move relative to the bottom end cap, and the number of directions, depends on the arrangement of the tethers and the way in which the tethers are coupled to the top and bottom end caps.

In certain applications, it may be desirable to change the direction in which a device is free to move or deform in response to an external load, and/or the number of directions in which the device is free to move or deform, in response to an external load. Changing the direction in which a device is free to move or deform in response to an external load may be referred to as changing the degrees of freedom of the device. Changing the degrees of freedom of a conventional device and/or the number of degrees of freedom of the conventional device typically requires using complex rigid mechanisms that increase the cost and mass of the device.

In contrast, an internally tensioned inflatable structure according to the present disclosure may be included in a device to enable the degrees of freedom of the device to be changed during operation without significantly increasing the cost and mass of the device. In one example, the locations where the tethers are coupled to the top and/or bottom end caps are adjustable to change the type and/or number of directions in which the top end cap can move freely relative to the bottom end cap. The types of direction in which the top end cap can move freely relative to the bottom end cap may include one or more of axial, bending, torsion, shear.

Referring now to FIG. 1A, an inflatable structure 10 includes a top end cap 12, a bottom end cap 14, a bladder 16, a nozzle 18, and a plurality of tethers 20. Each of the top and bottom end caps 12 and 14 is a rigid disk having a perimeter edge 22. The bladder 16 is attached to the perimeter edges 22 of the top and bottom end caps 12 and 14 and is configured to hold pressurized fluid between the top and bottom end caps 12 and 14. The nozzle 18 is operable to allow fluid to enter and exit the bladder 16. The tethers 20 are coupled to the top and bottom end caps 12 and 14. When the bladder 16 is inflated, the tethers 20 constrain the motion of the top end cap 12 relative to the bottom end cap 14, and thereby restrict the number and type of degrees of freedom of the inflatable structure 10.

In the inflatable structures described herein, it is assumed that the bottom end cap is stationary or fixed in space, and movement of the top end cap is only constrained by the tethers that connect the top and bottom end caps to one another. However, in various implementations, the top end cap may be stationary or fixed in space, and movement of the bottom end cap may only be constrained by the tethers that connect the top and bottom end caps to one another. In other implementations, neither one of the top or bottom end caps may be stationary or fixed in space, and movement of the top and bottom end caps may only be constrained by the tethers that connect the top and bottom end caps to one another.

The top and bottom end caps 12 and 14 provide hard attachment points for the tethers 20. The material and geometry of the top and bottom end caps 12 and 14 is selected to ensure that the top and bottom end caps 12 and 14 do not bend when a load or pressure is applied to either one of the top and bottom end caps 12 and 14. The top and bottom end caps 12 and 14 are made from a rigid material such as acrylonitrile butadiene styrene, Delrin®, or acetal. The top and bottom end caps 12 and 14 are sealed to the bladder 16. Thus, fluid is only allowed to enter or exit the bladder 16 through the nozzle 18.

The bladder 16 is configured to contain a pressurized fluid, such as a gas (e.g., air, helium) or a liquid, between the top and bottom end caps 12 and 14. The bladder 16 may be made from a soft inextensible skin. For example, the bladder 16 may be made from silicone, thermoplastic polyurethane (TPU), and/or a TPU-coated fabric. The geometry and/or material of the bladder 16 is selected to ensure that the bladder 16 does not affect the motion of the inflatable structure 10. Ideally, the bladder 16 is flexible in an axial direction 24 of the inflatable structure 10 and rigid in all radial directions of the inflatable structure 10 including a radial direction 26.

The nozzle 18 extends through the bottom end cap 14 is adjustable between an open position and a closed position. When the nozzle 18 is in the open position, the nozzle 18 allows fluid to enter or exit the bladder 16. When the nozzle 18 is in a closed position, the nozzle 18 prevents fluid from entering or exiting the bladder 16. The nozzle 18 may be a mechanically controlled valve (e.g., a Schrader valve or a Presta valve) or an electronically controlled valve.

Each tether 20 has an upper end 28 coupled to the top end cap 12 and a lower end 30 coupled to the bottom end cap 14. The tethers 20 are made from inextensible elongated structures such as yarn, thread, fishing line, Kevlar®, cable, string, and/or Spectra® fiber. The material strength of the tethers 20 is sufficient to withstand a predetermined load applied to the inflatable structure 10. Applying a load greater than the predetermined load to the inflatable structure 10 may cause the tethers 20 to buckle.

The length of the bladder 16 (i.e., the dimension of the bladder 16 in the axial direction 24) may be greater than the length of the tethers 20 to ensure that the tethers 20 are placed in tension in the bladder 16 has slack when the bladder 16 is inflated. In the example shown, the bladder 16 includes a folded portion 32 that extends in the axial direction 24 below the perimeter edge 22 of the bottom end cap 14 and is folded onto itself.

In FIG. 1A, the tethers 20 extend in the axial direction 24, which is perpendicular to the top and bottom end caps 12 and 14. If the tethers 20 were to extend in a direction other than the axial direction 24 when the bladder 16 is inflated, the length of the bladder 16 may be greater than an effective length of the tethers 20. The effective length of the tethers 20 is the distance by which the tethers 20 extend between the top and bottom end caps 12 and 14 in the axial direction 24.

Referring now to FIG. 1B, the upper end 28 of one or more (e.g., all) of the tethers 20 may be fixed to the top end cap 12 as shown. In the fixed attachment shown in FIG. 1B, the upper end 28 of each tether 20 is arranged in a loop 34 that is wrapped around a wire rod 36 and formed into a knot 38 (e.g., a slip knot). The wire rod 36 extends through tabs 40 of a bracket 42 that project from a base plate 44 of the bracket 42. The base plate 44 of the bracket 42 may be fixed to an underside surface 46 of the top end cap 12. Alternatively, the bracket 42 may be disposed and/or fixed within the top end cap 12.

Referring now to FIG. 1C, the upper end 28 of one or more (e.g., all) of the tethers 20 may be coupled to the top end cap 12 using a sliding or threaded attachment as shown. In the threaded attachment, the tether 20 is wrapped around a portion of the wire rod 36 in a manner that allows the tether 20 to slide relative to the wire rod 36. The upper end 28 of each tether 20 may be coupled to the top end cap 12 using a threaded attachment other than that shown in FIG. 1C. For example, an eyelet or loop (not shown) with a threaded shaft extending therefrom may be threaded into the underside surface 46 of the top end cap 12, and the upper end of each tether 20 may extend through the loop.

If the tethers 20 are coupled to the top end cap 12 using a threaded attachment such as that shown in FIG. 1C, each tether 20 may actually be only one segment of a tether. For example, referring again to FIG. 1A, the inflatable structure 10 may include only two tethers, where a first one of the tethers includes a segment 20-1 and a segment 20-2, and a second one of the tethers includes a segment 20-3 and a segment 20-4. In addition, the first tether includes a segment near the top end cap 12 that extends between the segments 20-1 and 20-2, and the second tether includes a segment near the top end cap 12 that extends between the segments 20-3 and 20-4. Thus, each tether forms an upside-down U shape. An example of the inflatable structure 10 with this tether arrangement is shown in FIG. 14A.

Referring now to FIG. 1D, the lower end 30 of one or more (e.g., all) of the tethers 20 may be fixed to the bottom end cap 14 as shown. In the fixed attachment shown in FIG. 1C, a vented screw 48 is threaded through the bottom end cap 14, the tether 20 extends through a hole in the vented screw 48, and a crimp 50 is attached to the lower end 30 of the tether 20. The lower end 30 of each tether 20 may be coupled to the bottom end cap 14 using a fixed attachment other than that shown in FIG. 1D. For example, the lower end 30 of each tether 20 may be coupled to the bottom end cap 14 using a fixed attachment such as that shown in FIG. 1B.

When the inflatable structure 10 is inflated, the top end cap 12 is able to move freely relative to the bottom end cap 14 in a torsional direction 52 and a shearing direction 54. Thus, when the inflatable structure 10 is inflated, the inflatable structure 10 has two degrees of freedom—torsional motion and shearing motion. The torsional direction 52 extends around the axial direction 24. The shearing direction 54 extends within a plane that is parallel to the major surfaces of the top and bottom end caps 12 and 14.

The inflatable structure 10 may have another degree of freedom depending on how the tethers 20 are coupled to the top end cap 12. If the tethers 20 are coupled to the top end cap 12 using a threaded attachment such as that shown in FIG. 1C and the tethers 20 are arranged as shown in FIG. 14 A, the top end cap 12 is able to move freely relative to the bottom end cap 14 in a bending direction 56. Thus, when the inflatable structure 10 is inflated, the inflatable structure 10 has three degrees of freedom—torsional motion, shearing motion, and bending motion.

Referring now to FIGS. 1A and 2-6, the inflatable structure 10 is shown in various states and positions. In FIG. 3, the inflatable structure 10 is in an uninflated state (i.e., the bladder 16 does not contain pressurized fluid). In FIG. 4, the inflatable structure 10 is being inflated (i.e., pressurized fluid is flowing into the bladder 16). Fluid within the bladder 16 applies a pressure 58 to the top and bottom end caps 12 and 14, which urges the top and bottom end caps 12 and 14 away from one another and thereby maintains the tethers 20 in tension. In FIGS. 1A and 5, the inflatable structure 10 is fully inflated, but no external loads have been applied to the inflatable structure 10 in one of its degrees of freedom or directions of allowable motion. In FIGS. 2 and 6, a load is been applied to the top end cap 12 in the shearing direction 54 to move the top end cap 12 away from its position shown in FIGS. 1A and 5.

Figure 7:
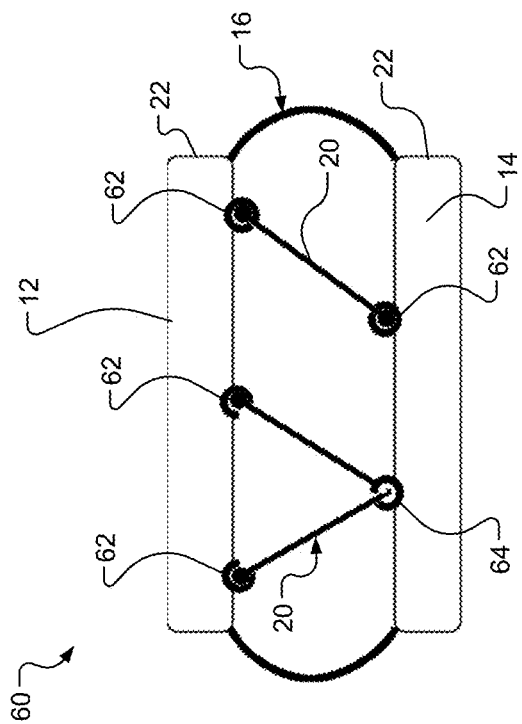
FIG. 7 is a section view of another inflatable structure according to the present disclosure.

Referring now to FIGS. 7 and 8, an inflatable structure 60 includes two of the tethers 20 constraining the motion of the top end cap 12 relative to the bottom end cap 14, and thereby restricting the number and type of degrees of freedom of the inflatable structure 60. The tether 20 on the right is coupled to both the top and bottom end caps 12 and 14 using a fixed attachment 62 such as the fixed attachment shown in FIG. 1B. The tether 20 on the left is coupled to the top end cap 12 using the fixed attachment 62 each of the opposite ends, and is coupled to the bottom end cap 14 using a threaded attachment 64 such as that shown in FIG. 1C.

When an external load 66 is applied to the top end cap 12 as shown in FIG. 8, the top end cap 12 moves in a bending direction 68. Thus, the inflatable structure 60 has a degree of freedom in the bending direction 68. As the top end cap 12 moves in the bending direction 68, the tether 20 on the right rotates or swings in a direction 70 about the fixed attachment 62 between the tether 20 on the right and the bottom end cap 14. In addition, the tether 20 on the left slides through the threaded attachment 64 in a direction 72. Thus, a segment 74 of the tether 20 on the left becomes shorter, while a segment 76 of the tether 20 on the right becomes longer.

When the external load 66 is released (i.e., no longer applied to the top end cap 12), the top end cap 12 moves to, or at least toward, its original position in FIG. 7. The position to which the top end cap 12 moves when the external load 66 is released depends on the shape of the bladder 16 the length of the tethers 20. The position to which the top end cap 12 moves when the load 66 is released may be referred to as the equilibrium position of the top end cap 12.

Figure 11:
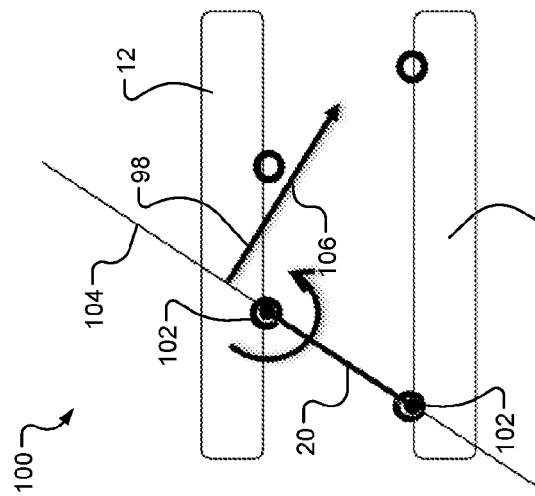
FIG. 11 is a section view of another inflatable structure according to the present disclosure.
Figure 10:
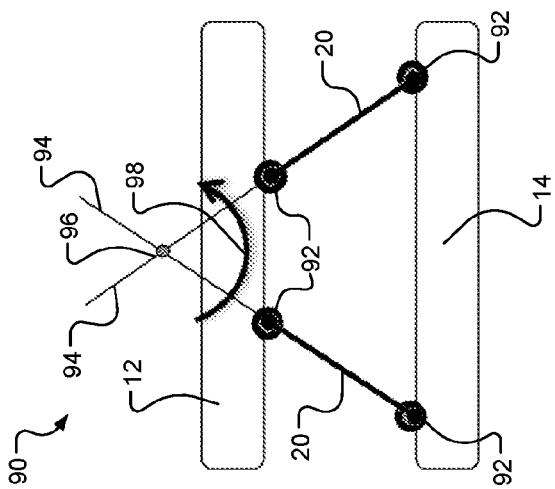
FIG. 10 is a section view of another inflatable structure according to the present disclosure.
Figure 9:
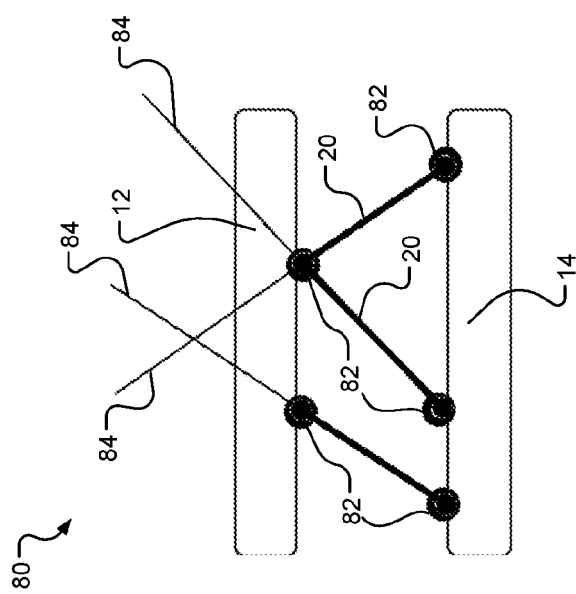
FIG. 9 is a section view of another inflatable structure according to the present disclosure.

Referring now to FIGS. 9-11, various inflatable structures with different numbers of degrees of freedom are shown. FIG. 9 shows an inflatable structure 80 including three of the tethers 20 constraining the motion of the top end cap 12 relative to the bottom end cap 14, and thereby restricting the number and type of degrees of freedom of the inflatable structure 80. All of the tethers 20 are coupled to the top and bottom end caps 12 and 14 using a fixed attachment 82 such as that shown in FIG. 1B. The tethers 20 on the right are coupled to the top end cap 12 at a common location. However, the tether 20 on the left is coupled to the top end cap 12 independent of the coupling between the tethers 20 on the right and the top end cap 12. Thus, the top end cap 12 does not have an instant center. This is evident from lines 84 extending through the tethers 20, as there is no single intersection between all three of the lines 84. Since top end cap 12 does not have an instant center, the inflatable structure 80 has zero degrees of freedom. In other words, motion of the top end cap 12 relative to the bottom end cap 14 is constrained in all directions (e.g., axial, bending, torsion, shearing).

FIG. 10 shows an inflatable structure 90 including two of the tethers 20 constraining the motion of the top end cap 12 relative to the bottom end cap 14, and thereby restricting the number and type of degrees of freedom of the inflatable structure 90. Both of the tethers 20 are coupled to the top and bottom end caps 12 and 14 using a fixed attachment 92 such as that shown in FIG. 1B. In addition, lines 94 extending through the tethers 20 intersect one another at a location 96, which indicates that the top end cap 12 has an instant center at the location 96. Thus, the top end cap 12 is free to move relative to the bottom end cap 14 in a bending direction 98 disposed about the location 96. Accordingly, the inflatable structure 90 has one degree of freedom or direction of allowable motion—bending motion.

FIG. 11 shows an inflatable structure 100 including only one of the tethers 20 constraining the motion of the top end cap 12 relative to the bottom end cap 14, and thereby restricting the number and type of degrees of freedom of the inflatable structure 100. The tether 20 is coupled to both the top and bottom end caps 12 and 14 using a fixed attachment 102 such as that shown in FIG. 1B. The tether 20 has an infinite number of instant centers on a line 104 extending through the tether 20. Thus, the top end cap 12 is free to rotate about any point on the line 104. The line 104 may be referred to as a locus of instant centers. In addition, the top end cap 12 has an instant center at infinity in a direction 106 perpendicular to the line 104. Thus, the top end cap 12 is translatable in the direction 106. Accordingly, the top end cap 12 has two degrees of freedom—axial motion and bending motion.

In FIGS. 9-11, each tether 20 is coupled to the top and bottom end caps 12 and 14 using a fixed attachment. Thus, each tether 20 acts as a rigid link. If the inflatable structures were modified by coupling any of the tethers 20 to the top end cap 12 and/or the bottom end cap 14 using a threaded attachment such as that shown in FIG. 1C, the number and/or type of degrees of freedom of the inflatable structures would be different.

In addition, FIGS. 9-11 are two-dimensional representations of the inflatable structures with all of the tethers 20 disposed in a common plane. It should be understood that the inflatable structures may include an identical set of tethers 20 disposed within a plane that is parallel to the plane in which the illustrated tethers 20 are disposed. Thus, for example, the inflatable structure 90 shown in FIG. 9 may represent a four-bar linkage.

Referring now to FIGS. 12A-12E, an inflatable structure 110 is shown with the tethers 20 arranged in a manner that constrains motion of the top end cap 12 relative to the bottom end cap 14 in all directions. Thus, the inflatable structure 110 is fully constrained, and the inflatable structure 110 has zero degrees of freedom. FIG. 12A shows that the inflatable structure 110 includes eight of the tethers 20. Three of the tethers 20 are coupled to the bottom end cap 14 at one location, another three of the tethers 20 coupled to the bottom end cap 14 at another location, and two of the tethers 20 are coupled to the bottom end cap 14 at other locations. All of the tethers 20 are coupled to the top and bottom end caps 12 and 14 using a fixed attachment such as that shown in FIG. 1B.

FIG. 12B shows that the tethers 20 constrain motion of the top end cap 12 in an axial direction 112. In the drawings, one hatching style is used for direction arrows to indicate that motion is constrained in that direction, while another hatching style is used for direction arrows to indicate that motion is allowed in that direction. FIG. 12C shows that the tethers 20 constrain motion of the top end cap 12 in a bending direction 114. FIG. 12D shows that the tethers 20 constrain motion of the top end cap 12 in a torsional direction 116. FIG. 12E shows that the tethers 20 constrain motion of the top end cap 12 in a shearing direction 118.

Referring now to FIGS. 13A-13E, an inflatable structure 120 is shown with the tethers 20 arranged in a manner that allows the top end cap 12 to move freely relative to the bottom end cap 14 in two directions. Thus, the inflatable structure 120 has two degrees of freedom. FIG. 13A shows that the inflatable structure 120 includes four of the tethers 20. All of the tethers 20 extend in the axial direction 24 (FIG. 1A). In addition, all of the tethers 20 are coupled to the top end cap 12 at different locations, and all of the tethers 20 are coupled to the bottom end cap 14 at different locations. Further, all of the tethers 20 are coupled to the top and bottom end caps 12 and 14 using a fixed attachment such as that shown in FIG. 1B.

FIG. 13B shows that the tethers 20 constrain motion of the top end cap 12 in an axial direction 122. FIG. 13C shows that the tethers 20 constrain motion of the top end cap 12 in a bending direction 124. FIG. 13D shows that the tethers 20 allow the top end cap 12 to move freely in a torsional direction 126. FIG. 13E shows that the tethers 20 allow the top end cap 12 to move freely in a shearing direction 128.

Referring now to FIGS. 14A-14F, an inflatable structure 130 is shown with the tethers 20 arranged in a manner that allows the top end cap 12 to move freely relative to the bottom end cap 14 in three directions. Thus, the inflatable structure 130 has three degrees of freedom. The inflatable structure 130 includes two of the tethers 20. While FIG. 14A shows the entire portion of the tether 20 in the front, a portion of the tether 20 in the rear is hidden. However, the tether 20 in the rear arranged identical to the tether 20 in front. Thus, the tethers 20 form a double loop (or two upside-down U shapes). Each tether 20 is coupled to the top end cap 12 using a pair of threaded attachments 132 such as that shown in FIG. 1C, and each tether 20 is coupled to the bottom end cap 14 using fixed attachments 134 such as that shown in FIG. 1B.

FIG. 14B shows that the tethers 20 constrain motion of the top end cap 12 in an axial direction 136. FIG. 14C shows that the tethers 20 constrain motion of the top end cap 12 in a bending direction 138. FIG. 14D shows that, if the tethers 20 were coupled to the top end cap 12 using the fixed attachments 134 instead of the threaded attachments 132, the tethers 20 would constrain motion of the top end cap 12 in the bending direction 138. Thus, the inflatable structure 130 would have two degrees of freedom. FIG. 14E shows that the tethers 20 allow the top end cap 12 to move freely in a torsional direction 140. FIG. 14F shows that the tethers 20 allow the top end cap 12 to move freely in a shearing direction 142.

Referring now to FIGS. 15A-15E, an inflatable structure 150 is shown with the tethers 20 arranged in a manner that allows the top end cap 12 to move freely relative to the bottom end cap 14 in two directions. Thus, the inflatable structure 120 has two degrees of freedom. FIG. 15A shows that the inflatable structure 120 includes three of the tethers 20. All of the tethers 20 are coupled to the top end cap 12 at different locations, and of the tethers 20 are coupled to the bottom end cap 14 at the same location. Thus, the tethers 20 form an upside-down tripod shape. In addition, all of the tethers 20 are coupled to the top and bottom end caps 12 and 14 using a fixed attachment such as that shown in FIG. 1B.

FIG. 15B shows that the tethers 20 constrain motion of the top end cap 12 in an axial direction 152. FIG. 15C shows that the tethers 20 allow the top end cap 12 to move freely in a bending direction 154. FIG. 15D shows that the tethers 20 allow the top end cap 12 to move freely in a torsional direction 156. FIG. 15E shows that the tethers 20 constrain motion of the top end cap 12 in a shearing direction 158.

Referring now to FIGS. 16A-16E, an inflatable structure 160 is shown with a single tether 20 arranged in a manner that allows the top end cap 12 to move freely relative to the bottom end cap 14 in three directions. Thus, the inflatable structure 160 has three degrees of freedom. FIG. 16A shows that the tether 20 extends in the axial direction 24 (FIG. 1A). The tether 20 is fixed to the top and bottom end caps 12 and 14 using a fixed attachment such as that shown in FIG. 1B.

FIG. 16B shows that the tethers 20 constrain motion of the top end cap 12 in an axial direction 162. FIG. 16C shows that the tethers 20 allow the top end cap 12 to move freely in a bending direction 164. FIG. 16D shows that the tethers 20 allow the top end cap 12 to move freely in a torsional direction 166. FIG. 16E shows that the tethers 20 constrain motion of the top end cap 12 in a shearing direction 168.

Figure 18:
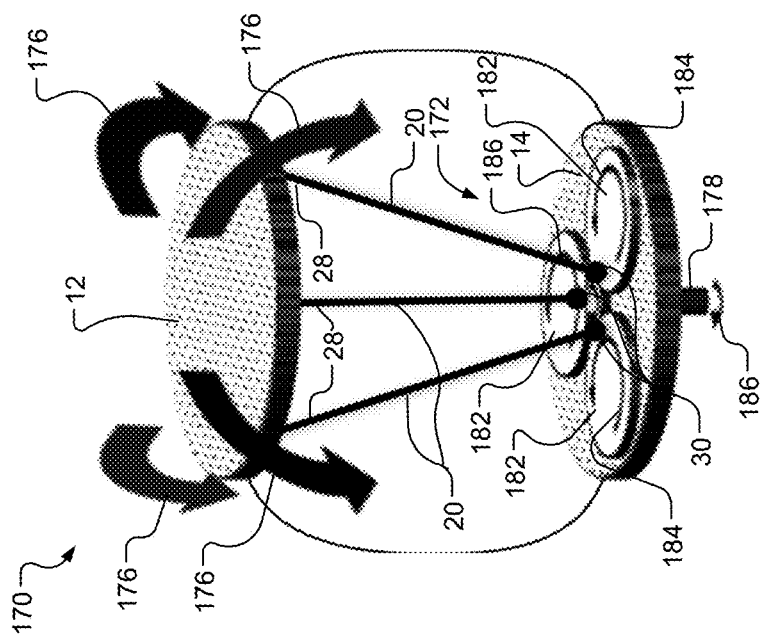
FIG. 18 is a perspective view of the inflatable structure of FIG. 17 with the locations of the lower ends of the tethers altered relative to their locations in FIG. 17.
Figure 17:
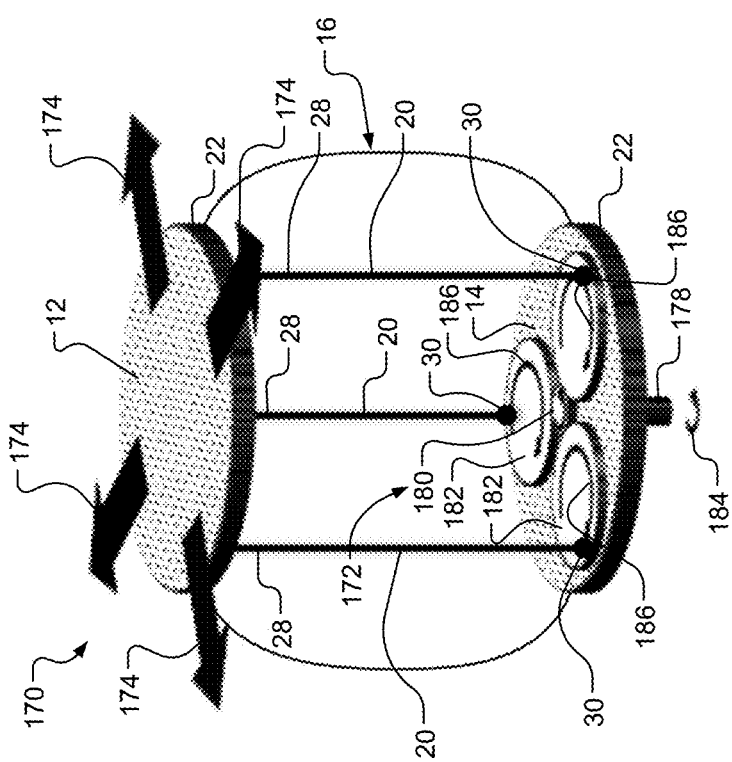
FIG. 17 is a perspective view of another inflatable structure according to the present disclosure, the inflatable structure including a rotary adjustment mechanism operable to change the locations of the lower ends of the tethers.

Referring now to FIGS. 17 and 18, an inflatable structure 170 includes the top end cap 12, the bottom end cap 14, the bladder 16, three of the tethers 20, and a rotary adjustment mechanism 172. The upper ends 28 of the tethers 20 are coupled to the top end cap 12 at different locations using a fixed attachment such as that shown in FIG. 1B. The lower ends 30 of the tethers 20 are coupled to the bottom end cap 14 at different locations.

In FIG. 17, all of the tethers 20 extend in the axial direction 24 (FIG. 1A), and the lower ends 30 of the tethers 20 are located adjacent to the perimeter edges 22 of the bottom end cap 14. Thus, the top end cap 12 is movable in a shear direction 174. In FIG. 18, the tethers 20 converge toward one another in a direction from the top end cap 12 to the bottom end cap 14 to form an upside-down tripod shape, and the lower ends 30 of the tethers 20 are located near the center of the bottom end cap 14. Thus, the top end cap 12 is movable in a bending direction 176.

The rotary adjustment mechanism 172 is operable to move the lower ends 30 of the tethers 20 from their positions shown in FIG. 17 to their positions shown in FIG. 18, and thereby adjust the degree of freedom of the inflatable structure 170 from sheer motion to bending motion. The rotary adjustment mechanism 172 includes a drive shaft 178, a sun gear 180, and three planet gears 182. The drive shaft 178 extends through the bottom end cap 14. The sun gear 180 is disposed within the bladder 16 and attached to the drive shaft 178 such that the sun gear 180 rotates with the drive shaft 178. The planet gears 182 are disposed within the bladder 16 and coupled to the bottom end cap 14 in a manner that allows the planet gears 182 to rotate.

The teeth of the planet gears 182 are engaged with the teeth of the sun gear 180 such that rotation of the sun gear 180 in a counterclockwise direction 184 causes the planet gears 182 to rotate in a clockwise direction 186. The lower ends 30 of the tethers 20 are fixed to the planet gears 182 near the outer parameters thereof using, for example, fasteners and/or adhesive. Thus, rotating the planet gears 182 in the clockwise direction 186 rotates the lower ends 30 of the tethers 20 about the rotational axes of the planet gears 182, and thereby moves the lower ends 30 from their positions shown in FIG. 17 to their position shown in FIG. 18.

To move the lower ends 30 of the tethers 20 from their positions shown in FIG. 18 to their positions shown in FIG. 17, the drive shaft 178 and the sun gear 180 may be rotated in the clockwise direction 186 as shown in FIG. 18. Rotation of the sun gear 180 in the clockwise direction 186 causes the planet gears 182 to rotate in the counterclockwise direction 184. Rotating the planet gears 182 in the clockwise direction 186 rotates the lower ends 30 of the tethers 20 about the rotational axes of the planet gears 182, and thereby moves the lower ends 30 from their positions shown in FIG. 18 to their position shown in FIG. 17.

The rotary adjustment mechanism 172 may be operated manually or automatically. In an example of the former, the drive shaft 178 is rotated by hand to move the lower ends 30 of the tethers 20 and thereby adjust the degree of freedom of the inflatable structure 170 from sheer motion to bending motion. In an example of the latter, an electric motor (not shown) is connected to the drive shaft 178, and a motor control module (not shown) controls the electric motor to rotate the drive shaft 178 in response to a user input. For example, a user may interface with button, switch, or touchscreen to command the rotary adjustment mechanism 172 to adjust the degree of freedom of the inflatable structure 170.

Figure 20:
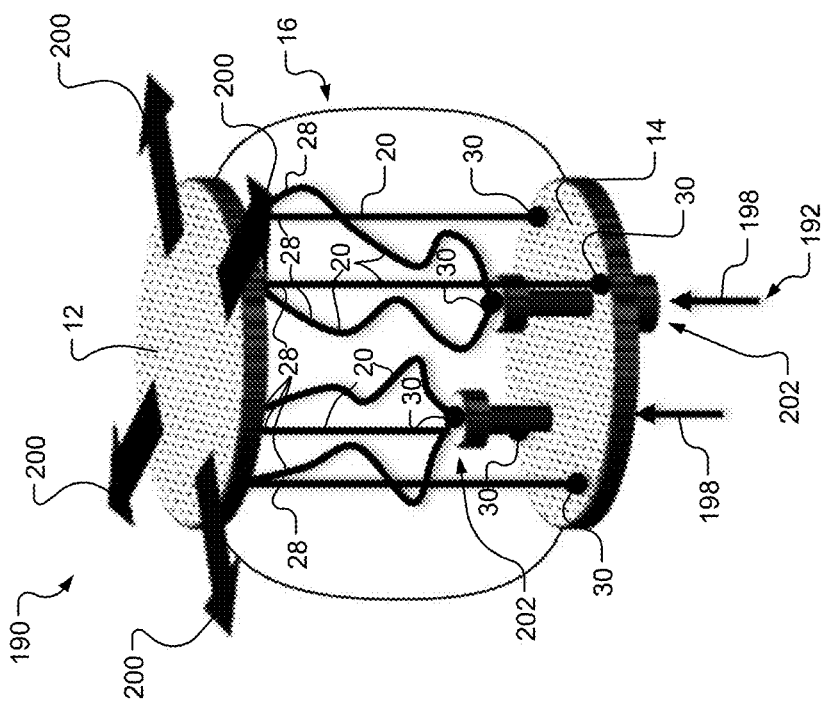
FIG. 20 is a perspective view of the inflatable structure of FIG. 19 with the locations of the lower ends of the tethers altered relative to their locations in FIG. 19
Figure 19:
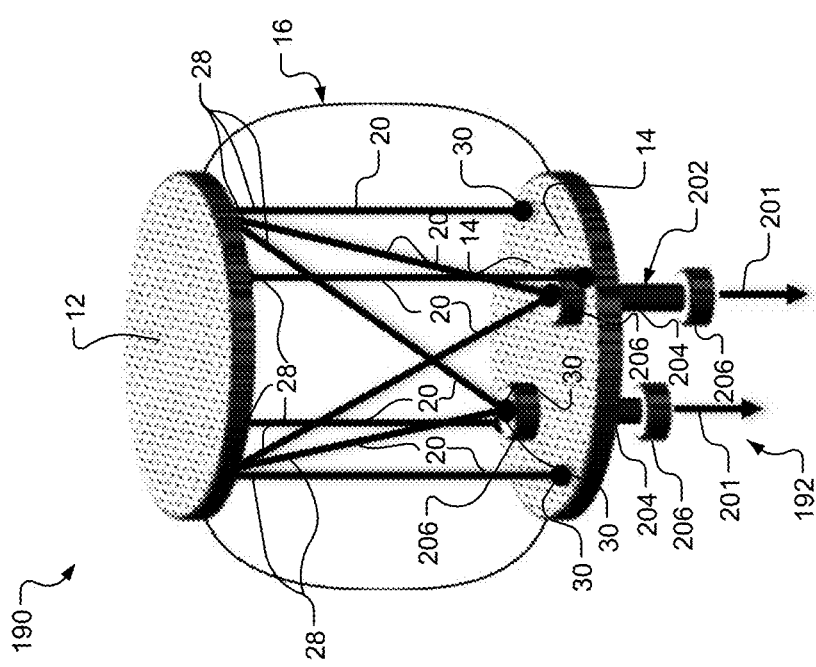
FIG. 19 is a perspective view of another inflatable structure according to the present disclosure, the inflatable structure including a linear adjustment mechanism operable to change the locations of the lower ends of the tethers.

Referring now to FIGS. 19 and 20, an inflatable structure 190 includes the top end cap 12, the bottom end cap 14, the bladder 16, eight of the tethers 20, and a linear adjustment mechanism 192. Four of the tethers 20 extend in the axial direction 24 (FIG. 1A) and are coupled to both the top and bottom end caps 12 and 14 using a fixed attachment such as that shown in FIG. 1B. The other four tethers 20 are coupled to the top end cap 12 using a fixed attachment such as that shown in FIG. 1B and extend diagonally from the top end cap 12 to the bottom end cap 14. The lower ends 30 of those four tethers 20 are coupled to the linear adjustment mechanism 192 using a fixed attachment such as that shown in FIG. 1B.

In FIG. 19, all of the tethers 20 are in tension (i.e., the tension level of all of the tethers 20 is greater than zero). The tension in the tethers 20 and the arrangement (e.g., number, attachment locations, etc.) of the tethers 20 constrains motion of the top end cap 12 relative to the bottom end cap 14 in all directions. Thus, the inflatable structure 190 is fully constrained, and the inflatable structure 190 has zero degrees of freedom.

In FIG. 20, the linear adjustment mechanism 192 has raised the lower ends 30 of four of the tethers 20 in an upward direction 198 to release the tension in the tethers 20 (i.e., to reduce the tension in those four tethers 20 to zero). In turn, the inflatable structure 190 is able to move freely in a shear direction 200. Thus, the inflatable structure 190 has one degree of freedom. In this manner, the linear adjustment mechanism 192 is operable to change the number of the degrees of freedom of the inflatable structure 190. The lower ends 30 of the four tethers 20 attached to the linear adjustment mechanism 192 can be returned to their positions shown in FIG. 19 by moving the linear adjustment mechanism 192 in a downward direction 201.

The linear adjustment mechanism 192 includes a pair of pegs 202. Each peg 202 includes a cylindrical shaft 204 having a first diameter, and opposite cylindrical ends 206 having a second diameter that is greater than the first diameter. One cylindrical end 206 is disposed within the bladder 16, and the other cylindrical end 206 is disposed outside of the bladder 16. The first diameter of the cylindrical shaft 204 may be selected to yield a line-to-line fit or slight clearance fit between the cylindrical shaft 204 and a hole in the bottom end cap 14 through which the cylindrical shaft 204 translates. The second diameter of the cylindrical ends 204 may be selected to ensure that the cylindrical end 204 disposed within the bladder 16 cannot be pulled in the downward direction 201 through the bottom end cap 14.

The lower ends 30 of two of the tethers 20 are coupled to one of the cylindrical ends 206 disposed within the bladder 16 using a fixed attachment such as that shown in FIG. 1B. The lower ends 30 of another two of the tethers 20 are coupled to the other cylindrical end 206 disposed within the bladder 16 using a fixed attachment such as that shown in FIG. 1B. Thus, moving the pegs 202 in the upward direction 198 moves the lower ends 30 of the tethers 20 attached to the pegs 202 in the upward direction 198 and thereby releases the tension in those tethers 20. Conversely, moving the pegs 202 in the downward direction 201 moves the lower ends 30 of the tethers 20 attached to the pegs 202 in the downward direction 201 and thereby places those tethers 20 in tension. The pegs 202 may be locked into position to maintain the tethers in tension using friction, detents, cotter pins, lock nuts, expandable plug, removable snap rings, and/or a twist-lock. Placing the tethers 20 in tension may be referred to as engaging the tethers 20, and releasing the tension and the tethers 20 may be referred to as disengaging the tethers 20.

The linear adjustment mechanism 192 may be operated manually or automatically. In an example of the former, the pegs 202 are translated by hand to move the lower ends 30 of the tethers 20 and thereby adjust the number of the degrees of freedom of the inflatable structure 190. In an example of the latter, a hydraulic, pneumatic, or electromechanical linear actuator (not shown) is coupled to the pegs 202, and an actuator control module (not shown) controls the linear actuator to translate the pegs 202 in response to a user input. For example, a user may interface with button, switch, or touchscreen to command the linear actuator to adjust the degrees of freedom of the inflatable structure 190.

Referring now to FIGS. 21 and 22, a coil spring 210 may be included in any of the inflatable structures disclosed herein to align the top and bottom end caps 12 and 14 relative to one another when the inflatable structures are stowed or deflated. The coil spring 210 has a first end 212 and a second end 214 opposite of the first end 212. If the coil spring 210 is included in an inflatable structure, the coil spring 210 is disposed within the bladder 16, and the first and second ends 212 and 214 of the coil spring 210 are fixed to the top and bottom end caps 12 and 14, respectively.

When the inflatable structure is deflated, the coil spring 210 is in a relaxed state as shown in FIG. 21. When the inflatable structure is inflated, the first and second ends 212 and 214 of the coil spring 210 are pulled apart from one another, which places the coil spring 210 in tension as shown in FIG. 22. When the inflatable structure is once again deflated, the radial stiffness of the coil spring 210 ensures that the top end cap 12 remains aligned with the bottom end cap 14 in all radial directions of the inflatable structure. The coil spring 210 may also impart a rotational force on the top end cap 12 about the axial direction 24, which twist the bladder 16 and thereby pulls the bladder 16 radially inward as the inflatable structure is stowed. This ensures that the bladder 16 stows neatly and protects the bladder 16 from damage when the bladder 16 is stowed.

Referring now to FIGS. 23 and 24, a multi-turn wave spring 220 may be included in any of the inflatable structures disclosed herein to align the top and bottom end caps 12 and 14 relative to one another when the inflatable structures are stowed or deflated. The wave spring 220 has a first end 222 and a second end 224 opposite of the first end 222. The wave spring 220 includes three tabs 226 disposed at each of the first and second ends 222 and 224. If the wave spring 220 is included in inflatable structure, the wave spring 220 is placed within the bladder 16, and the tabs 226 at the first and second ends 222 and 224 of the wave spring 220 are fixed to the top and bottom end caps 12 and 14, respectively.

When the inflatable structure is deflated, the wave spring 220 is in a relaxed state as shown in FIG. 23. When the inflatable structure is inflated, the first and second ends 222 and 224 of the wave spring 220 are pulled apart from one another, which places the wave spring 220 in tension as shown in FIG. 24. When the inflatable structure is once again deflated, the radial stiffness of the wave spring 220 ensures that the top end cap 12 remains aligned with the bottom end cap 14 in all radial directions of the inflatable structure. The wave spring 220 may also impart a rotational force on the top end cap 12 about the axial direction 24, which twist the bladder 16 and thereby pulls the bladder 16 radially inward as the inflatable structure is stowed. This ensures that the bladder 16 stows neatly and protects the bladder 16 from damage when the bladder 16 is stowed.

Referring now to FIGS. 25, 26A, 26B, and 27, an inflatable structure 230 that is similar to any of the inflatable structures disclosed herein may be included in a rear spoiler 232 of a vehicle 234. The rear spoiler 232 includes an outer panel 236 and a base plate 238. The outer panel 236 serves as the top end cap 12 of the inflatable structure 230, and the baseplate 238 serves as the bottom end cap 14 of the inflatable structure 230. The bladder 16 attached to the outer panel 236 and the baseplate 238 and is configured to hold pressurized fluid between the outer panel 236 and the baseplate 238. The tether 20 is disposed within the bladder 16. The tether 20 has a first end 240 and a second end 242 opposite of the first end 240.

The inflatable structure 230 further includes a reel 244 disposed within the bladder 16. The reel 244 may be mounted to the baseplate 238 in a manner that allows the reel 244 to rotate about its central axis. The tether 20 extends around the reel 244, and the first and second ends 240 and 242 of the tether 20 are coupled to the outer panel 236 using a fixed attachment such as that shown in FIG. 1B. The tether 20 includes a first segment 246 that extends between the reel 244 and the first end 240 of the tether 20, and a second segment 248 that extends between the reel 244 and the second end 242 of the tether 20. The reel 244 is operable to adjust a first length of the first segment 246 and a second length of the second segment 248 and thereby adjust a shape of the inflatable structure 230 and the rear spoiler 232.

In FIG. 25, the inflatable structure 230 is uninflated, and therefore the rear spoiler 232 is in a stowed state. In FIG. 26A, the inflatable structure 230 has been inflated, and therefore the rear spoiler 232 is a deployed state. In FIG. 26B, the reel 244 is rotated in a counterclockwise direction 250, which causes the tether 20 to translate in the directions 252. In turn, the first length of the first segment 246 becomes shorter, and the second length of the second segment 248 becomes longer. As a result, the outer panel 236 rotates in a direction 254 from its position shown in FIG. 26A to its position shown in FIG. 27, which changes the shape of the inflatable structure 230 and the rear spoiler 232. Changing the shape of the rear spoiler 232 from that shown in FIG. 26A to that shown in FIG. 27 changes the path in which air flows past the vehicle 234 from a first flow path 256 to a second flow path 258, which may improve the aerodynamics of the vehicle 234.

The vehicle 234 may further include an electric motor 260 and a motor control module 262. The electric motor 260 is coupled to the reel 244 and is operable to rotate the reel 244 in the counterclockwise direction 250 or a clockwise direction opposite of the counterclockwise direction 250. The motor control module 262 controls the electric motor 260 to rotate the reel 244 and thereby change the shape of the inflatable structure 230 and the rear spoiler 232. The motor control module 262 may control the electric motor 260 to rotate the reel 244 based on a user input. Additionally or alternatively, the motor control module 262 may control the motor 260 to rotate the reel 244 based on a vehicle operating parameter. For example, the motor control module 262 may control the motor 260 to rotate the reel 244 to change the shape of the rear spoiler 232 from that shown in FIG. 26A to that shown in FIG. 27 when the speed of the vehicle 234 is greater than a predetermined speed.

Referring now to FIGS. 28-30, an inflatable structure 270 that is similar to any of the inflatable structures disclosed herein may be included in an air dam 272 of a vehicle 274. The air dam 272 includes an outer panel 276 that serves as the top end cap 12 of the inflatable structure 270. The bottom end cap 14 of the inflatable structure 270 is hidden by the body panel of the vehicle 274. The bladder 16 is attached to the outer panel 276 and the bottom end cap 14 and is configured to hold pressurized fluid therebetween. The tethers 20 are disposed within the bladder 16 and are coupled to the outer panel 276 and the bottom end cap 14 using a fixed connection such as that shown in FIG. 1B.

In FIG. 28, the inflatable structure 270 is deflated, and therefore the air dam 272 is in a stowed state. In FIG. 29, the inflatable structure 270 is inflated, and therefore the air dam 272 is in a deployed state. When the vehicle 274 is moving, wind applies a load 278 to the outer panel 276 of the air dam 272. However, the strength and arrangement of the tethers 20 enables the inflatable structure 270 to withstand the load 278 without deforming.

In FIG. 30, the outer panel 276 of the air dam 272 contacts an object 280, which applies a load 282 to the outer panel 276. The load 282 is significantly greater than the load 278, and is sufficient to cause the inflatable structure 270 deform or collapse. Since the inflatable structure 270 deforms or collapses under the load 278, the contact between the object 280 and the outer panel 276 may not damage the air dam 272 or the components of the vehicle 274 to which the air dam 272 is attached.

Referring now to FIGS. 31-34, an inflatable structure 290 that is similar to any of the inflatable structures described herein may be included in a control knob 292. The inflatable structure 290 includes the top end cap 12, the bottom end cap 14, the bladder 16, and six of the tethers 20. The bladder 16 forms the outer surface of the control knob 292. The upper ends 28 of the tethers 20 are coupled to the top end cap 12, and the lower ends 30 of the tethers 20 are coupled to the bottom end cap 14. The upper and lower ends 28 and 30 of the tethers 20 are coupled to the top and bottom end caps 12 and 14 in a manner that allows the upper and lower ends 28 and 30 to move radially inward and radially outward relative to the top and bottom end caps 12 and 14.

In FIG. 31, the inflatable structure 290 is uninflated, and therefore the control knob 292 is in a stowed state. In FIG. 32, the inflatable structure 290 is inflated, and therefore the control knob 292 is in a deployed state. When the inflatable structure 290 is inflated and the upper and lower ends 28 and 30 of the tethers 20 are located adjacent to the other perimeters of the top and bottom end caps 12 and 14 as shown in FIG. 32, the tethers 20 extend in the axial direction 24 (FIG. 1A). In turn, the upper end cap 12 and the control knob 292 are movable in a shear direction 294.

In FIG. 33, an adjustment mechanism 296 adjusts the locations of the upper and lower ends 28 and 30 of the tethers 20 and thereby change the degrees of freedom of the inflatable structure 290. The adjustment mechanism 296 adjusts the locations of the upper and lower ends 28 and 30 of the tethers 20 from their locations shown in FIG. 32 to their locations shown in FIG. 34. When the locations of the upper and lower ends 28 and 30 of the tethers 20 are located as shown in FIG. 34, the tethers 20 form a pair of opposing tripods. In turn, the top end cap 12 and the control knob 292 are movable in a torsion direction 299.

The adjustment mechanism 296 includes a first tether system 298 and a second tether system 300. Each of the first and second tether systems 298 and 300 include a winding mechanism 302 and one or more segments 304 that wrap around the winding mechanism 302. The tethers segments 304 of the first tether system 298 are connected to the upper ends 28 of three of the tethers 20. The tethers segments three or four of the second tether system 300 are connected to the lower ends 30 of the other three tethers 20.

The winding mechanism 302 is operable to reel the tether segments 304 in or out. The winding mechanism 302 may be motorized reel or a pulley with a winding spring and a locking mechanism. To adjust the upper and lower ends 28 and 30 of the tethers 20 from the positions shown in FIG. 32 to the positions shown in FIG. 34, the winding mechanism 302 reels in the tether segments 304. The tether segments 304 is routed through a circular channel 306 similar to that found in a drawstring opening such that the reeling in the tether segments 304 moves the upper and lower ends 28 and 30 of the tethers 20 radially inward. The circular channel 306 may be spring-loaded in a radially outward direction such that reeling out the tether segments 304 allows the circular channel 306 to expand and thereby moves the upper and lower ends 28 and 30 of the tethers 20 radially outward.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," "top," "bottom," "side," and "disposed." Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. In addition, unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An inflatable structure comprising:
a top end cap;
a bottom end cap;
a bladder attached to the top and bottom end caps and configured to hold pressurized air between the top and bottom end caps;
a plurality of tethers disposed within the bladder, each tether in the plurality of tethers having a first end coupled to the top end cap and a second end coupled to the bottom end cap, wherein when the bladder is inflated, the plurality of tethers restrict a number of degrees of freedom of the inflatable structure and a type of the degrees of freedom; and
an adjustment mechanism operable to move the second end of at least one tether in the plurality of tethers to adjust at least one of the number of the degrees of freedom and the type of the degrees of freedom.

2. The inflatable structure of claim 1 wherein the adjustment mechanism is operable to move the second end of at least one tether in the plurality of tethers to adjust the number of the degrees of freedom.

3. The inflatable structure of claim 1 wherein the adjustment mechanism is operable to move the second end of at least one tether in the plurality of tethers to adjust the type of the degrees of freedom.

4. The inflatable structure of claim 1 wherein the adjustment mechanism is operable to move the second end of at least one tether in the plurality of tethers to adjust the type of the degrees of freedom between at least two of axial motion, bending motion, torsional motion, and shearing motion.

5. The inflatable structure of claim 1 wherein:
the first end of each tether in the plurality of tethers is fixed to the top end cap;
the adjustment mechanism is coupled to the bottom end cap;
at least a portion of the adjustment mechanism is disposed within the bladder; and
the second end of each tether in the plurality of tethers is fixed to the portion of the adjustment mechanism that is disposed within the bladder.

6. The inflatable structure of claim 1 wherein:
the adjustment mechanism includes a shaft extending through the bottom end cap, a sun gear disposed within the bladder and attached to the shaft, and at least one planet gear disposed within the bladder and engaged with the sun gear; and
the second end of at least one tether in the plurality of tethers is fixed to the at least one planet gear such that rotating the shaft causes the second end of the at least one tether to rotate about a rotational axis of the at least one planet gear.

7. The inflatable structure of claim 6 wherein:
the plurality of tethers includes a first tether, a second tether, and a third tether;
the at least one planet gear includes a first planet gear, a second planet gear, and a third planet gear; and
the second ends of the first, second, and third tethers are fixed to the first, second, and third planet gears, respectively, such that rotating the shaft causes the second ends of the first, second, and third tethers to rotate about the rotational axes of the first, second, and third planet gears and thereby adjusts the type of the degrees of freedom between a shearing motion and a bending motion.

8. The inflatable structure of claim 7 wherein rotating the shaft adjusts each of the first, second, and third tethers between a first position in which the first, second, and third tethers are perpendicular to the top and bottom end caps and a second position in which the first, second, and third tethers form a tripod shape.

9. The inflatable structure of claim 1 wherein:
the adjustment mechanism includes a first peg that extends through the bottom end cap;
the second end of at least one tether in the plurality of tethers is fixed to an end of the first peg disposed within the bladder; and
the first peg is translatable in a direction perpendicular to the bottom end cap to adjust a tension of the at least one tether and thereby adjust at least one of the number of the degrees of freedom and the type of the degrees of freedom.

10. The inflatable structure of claim 9 wherein the first peg is translatable in the direction perpendicular to the bottom end cap to adjust the tension of the at least one tether between zero tension and a tension level greater than zero.

11. The inflatable structure of claim 9 wherein:
the adjustment mechanism further includes a second peg that extends through the bottom end cap;
the plurality of tethers includes a first pair of tethers and a second pair of tethers;
the second end of each tether in the first pair of tethers is fixed to the end of the first peg disposed within the bladder;
the second end of each tether in the second pair of tethers is fixed to the end of the second peg disposed within the bladder; and
the first and second pegs are translatable in the direction perpendicular to the bottom end cap to adjust the tension of the first and second pairs of tethers and thereby adjust the number of the degrees of freedom and the type of the degrees of freedom.

12. A control knob including the inflatable structure of claim 1 wherein the adjustment mechanism is operable to move the second end of each tether in the plurality of tethers to adjust the degrees of freedom between a shearing motion and a torsional motion.

13. An inflatable structure comprising:
a top end cap;
a bottom end cap;

a bladder attached to the top and bottom end caps and configured to hold pressurized air between the top and bottom end caps;

a plurality of tethers disposed within the bladder, each tether in the plurality of tethers having a first end coupled to the top end cap and a second end coupled to the bottom end cap; and a spring disposed within the bladder and attached to the top and bottom end caps, wherein the spring is configured to align the top and bottom end caps relative to one another when the inflatable structure is adjusted from a deployed position to a stowed position.

14. The inflatable structure of claim 13 wherein the spring is further configured to twist the bladder about a longitudinal axis of the inflatable structure and thereby pull the bladder radially inward when the inflatable structure is adjusted from the deployed position to the stowed position.

15. The inflatable structure of claim 13 wherein the spring is a coil spring.

16. The inflatable structure of claim 13 wherein the spring is a wave spring.

17. The inflatable structure of claim 13 wherein the plurality of tethers extend in a direction perpendicular to the top and bottom end caps by a first distance, and the bladder has a length that is greater than the first distance such that, when the bladder is inflated, the plurality of tethers are in tension and the bladder has slack.

18. An inflatable structure comprising:

a top end cap;

a bottom end cap;

a bladder attached to the top and bottom end caps and configured to hold pressurized air between the top and bottom end caps;

a tether disposed within the bladder, the tether having a first end and a second end opposite of the first end, wherein the first and second ends of the tether are coupled to one of the top and bottom end caps; and a reel disposed within the bladder and coupled to the other one of the top and bottom end caps, the tether extending around the reel, the tether including a first segment that extends between the reel and the first end of the tether and a second segment that extends between the reel and the second end of the tether, wherein the reel is operable to adjust a first length of the first segment and a second length of the second segment and thereby adjust a shape of the inflatable structure.

19. An inflatable system comprising:

the inflatable structure of claim 18; and an electric motor operable to rotate the reel and thereby adjust the shape of the inflatable structure.

20. A spoiler of a vehicle including the inflatable structure of claim 18.

* * * * *